United States Patent [19]

Detloff et al.

[11] Patent Number: 5,046,697
[45] Date of Patent: Sep. 10, 1991

[54] SIX-WAY ADJUSTER APPARATUS AND METHOD

[75] Inventors: Clement A. Detloff, Southfield; Joseph J. Magyar, Rochester, both of Mich.

[73] Assignee: General Motors Corporation, Detroit, Mich.

[21] Appl. No.: 627,900

[22] Filed: Dec. 14, 1990

Related U.S. Application Data

[63] Continuation of Ser. No. 331,998, Apr. 3, 1989, abandoned.

[51] Int. Cl.5 ............................................. B60N 1/02
[52] U.S. Cl. ................................... 248/394; 248/396; 248/419; 297/328; 297/329
[58] Field of Search ............... 248/394, 396, 393, 419, 248/422, 429; 297/328, 329, 344, 348

[56] References Cited

U.S. PATENT DOCUMENTS

| | | | |
|---|---|---|---|
| 7,224 | 3/1850 | Searle | 248/396 |
| 789,813 | 5/1905 | Longley | 248/396 |
| 1,957,785 | 5/1934 | Knapp | 248/394 |
| 2,005,112 | 6/1935 | Smelker | 297/329 X |
| 2,134,135 | 10/1938 | Lefevre | 248/396 |
| 2,939,513 | 6/1960 | Leslie et al. | 248/394 |
| 3,313,512 | 4/1967 | Colautti et al. | 248/419 |
| 3,853,295 | 12/1974 | Christin | 248/396 |
| 3,910,543 | 10/1975 | Fourrey et al. | 248/396 |
| 4,257,569 | 3/1981 | Budinski | 248/396 X |
| 4,440,442 | 4/1984 | Drouillard et al. | 297/329 X |
| 4,767,157 | 8/1988 | Kazaoka et al. | 297/329 X |
| 4,805,865 | 2/1989 | Goforth | 297/328 X |

FOREIGN PATENT DOCUMENTS

| | | | |
|---|---|---|---|
| 2001501 | 4/1972 | Fed. Rep. of Germany | 248/394 |
| 2657181 | 6/1978 | Fed. Rep. of Germany | 248/394 |
| 1268195 | 6/1961 | France | 248/419 |
| 0537355 | 6/1941 | United Kingdom | 248/419 |

Primary Examiner—David L. Talbott
Assistant Examiner—Daniel Hulseberg
Attorney, Agent, or Firm—Ernest E. Helms

[57] ABSTRACT

A preferred embodiment seat adjuster according to the present invention has a first link which is pivotally connected typically along its rearward end to the vehicle floor. A powered gear is connected to the first link and is meshed with a sector gear which is connected to the forward end of the vehicle seat adjuster. The sector gear is also connected to the vehicle floor. Slidably mounted to the first link is a second link having a sector gear connected to its rearward end. The vehicle seat (or frame) is pivotally connected along its forward end to the second link and the vehicle seat has a powered gear which in meshed with the rearward sector gear of the second link. Longitudinal movement of the seat is provided by a worm gear rotatably connected to the second link and meshed with a rack connected with the first link. Elevation of forward end of the vehicle is accomplished by the powered gear rotatably connected with the first link and meshed with the sector gear connected with the vehicle floor. Elevation of the rearward end of the vehicle seat is accomplished by the powered gear connected with the seat which is meshed with the sector gear which is connected to the rearward end of the second link.

5 Claims, 3 Drawing Sheets 5,046,697

SIX-WAY ADJUSTER APPARATUS AND METHOD

This is a continuation of application Ser. No. 07/331998 filed on Apr. 3, 1990, now abandoned.

FIELD OF THE INVENTION

The field of the present invention is that of powered vehicle seat adjusters.

DISCLOSURE STATEMENT

Examples of powered vehicle seat adjusters can be found in Himka U.S. Pat. No. 2,924,265 and Borlinghaus U.S. Pat. No. 4,664,351.

SUMMARY OF THE INVENTION

The present invention provides a six-way powered seat adjuster which is an alternative to the six-way powered seat adjuster of the aforementioned patents which is far simpler, utilizes the same basic parts as a four-way powered seat adjuster, and has the structural rigidity and strength required to allow an occupant restraint belt to be fastened directly to the vehicle seat and/or adjuster rather than the belt having to be anchored to the vehicle floor.

A preferred embodiment seat adjuster according to the present invention has a first link which is pivotally connected typically along its rearward end to the vehicle floor. A powered gear is connected to the first link and is meshed with a sector gear which is connected to the forward end of the vehicle seat adjuster. The sector gear is also connected to the vehicle floor. Slidably mounted to the first link is a second link having a sector gear connected to its rearward end. The vehicle seat (or frame) is pivotally connected along its forward end to the second link and the vehicle seat has a powered gear which is enmeshed with the rearward sector gear of the second link. Longitudinal movement of the seat is provided by a worm gear rotatably connected to the second link and meshed with a rack connected with the first link. Elevation of the forward end of the vehicle is accomplished by the powered gear rotatably connected with the first link and enmeshed with the sector gear connected with the vehicle floor. Elevation of the rearward end of the vehicle seat is accomplished by the powered gear connected with the seat (or the frame of the seat) which is meshed with the sector gear which is connected to the rearward end of the second link.

It is an object of the present invention to provide a powered six-way vehicle seat adjuster.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
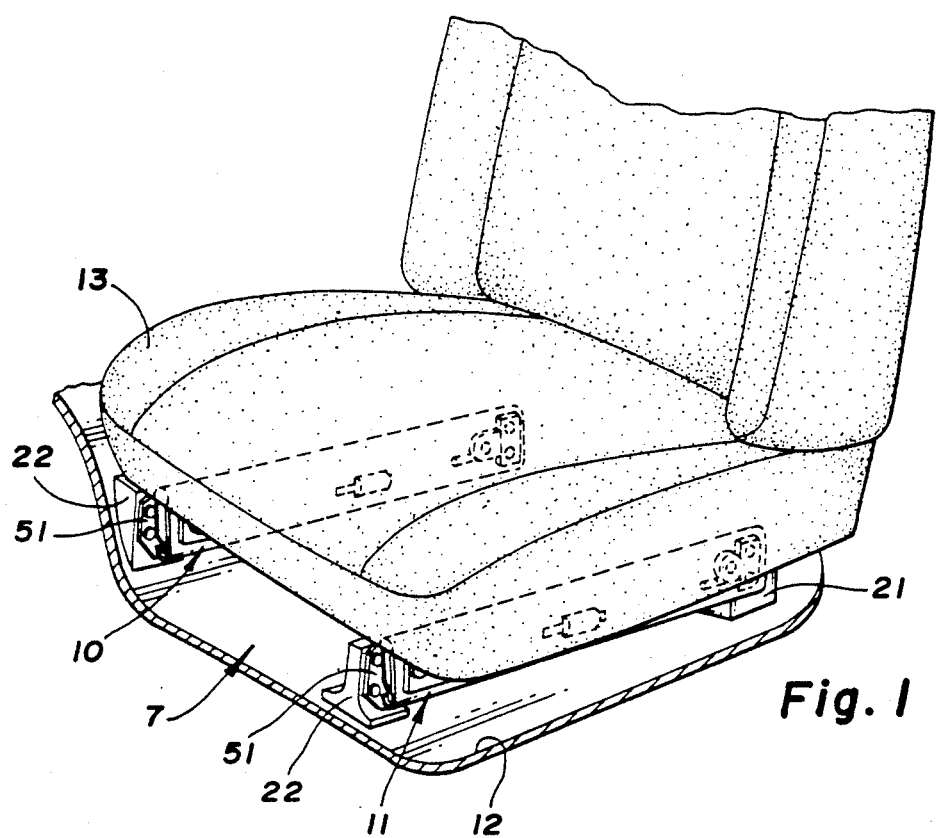
FIG. 1 is a perspective view of a preferred embodiment seat adjuster according to the present invention shown in the environment of a vehicle with a vehicle seat attached thereto.
Figure 2:
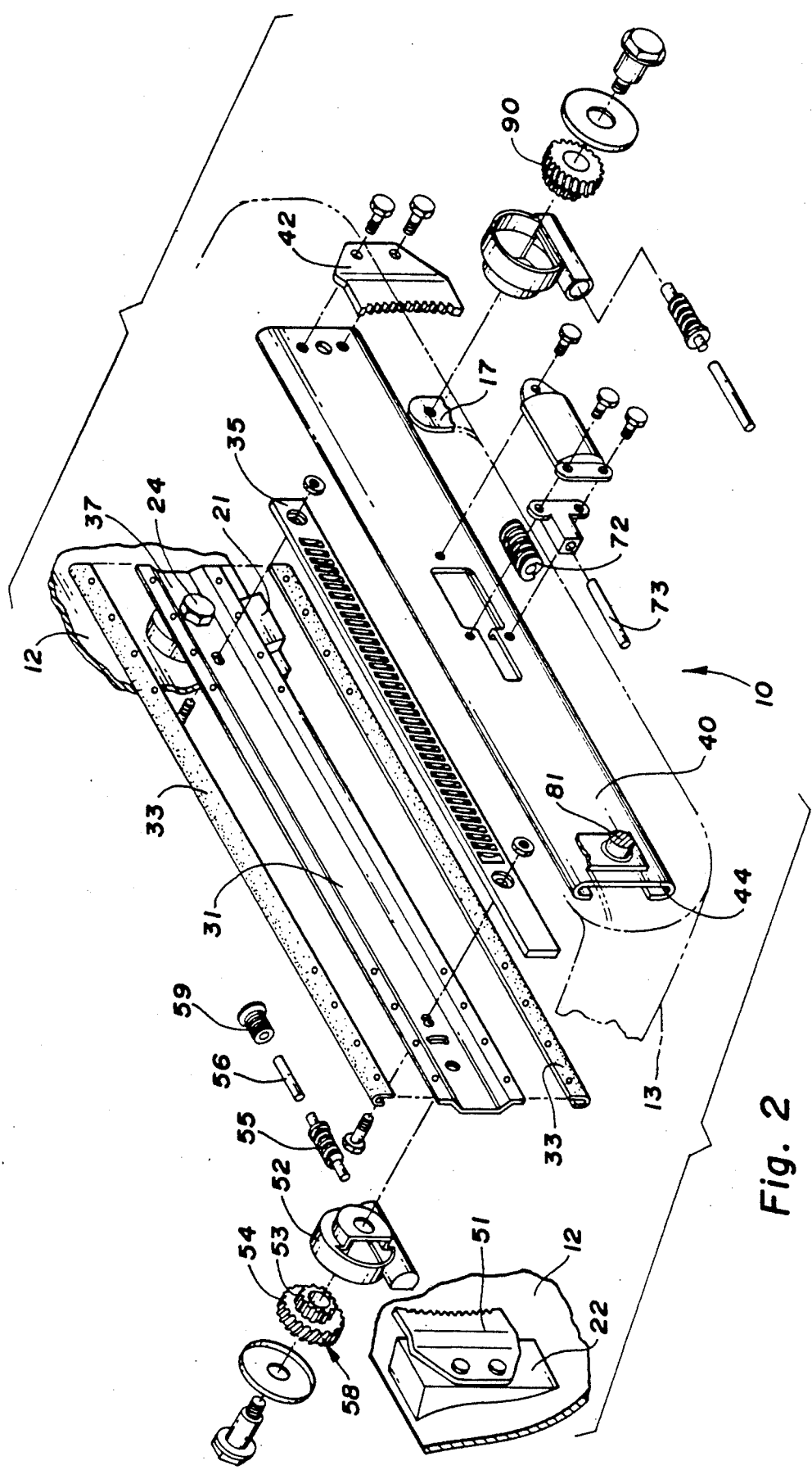
FIG. 2 is an exploded view of the seat adjuster slide mechanism of the adjuster according to the present invention.

Referring to FIGS. 1 and 2, the vehicle seat adjuster 7 according to the present invention has two generally parallel slide members 10 and 11. Typically, both slide members will be powered and work in unison, however, if desired, one of the slide members can be just a slave member which follows the motion of the powered master. In the interest of brevity the description for the master adjuster slide 10 will be given only.

To connect the vehicle seat adjuster 7 to the vehicle floor 12 there is a first rearward stand 21 and a second forward stand 22. A first link 31 is pivotally connected to the vehicle via its rearward first end with the rear stand 21 by a bolt 24. The first link 31 has upper and lower plastic slides 33, and also has a longitudinal rack 35 attached thereto by fasteners.

The forward stand 22 has connected thereto a first sector gear 51. To determine the elevation of the forward end of the first link 31 (forward end of a vehicle seat 13) there is a first powered gear 58 meshed with the first sector gear 51. The first powered gear 58 is a double gear mounted in a housing 52 having a window allowing to exposure of the smaller gear 53 for meshing with the first sector gear 51.

A larger gear 54 is meshed with a worm gear 55 which is in turn powered by cable 56. Cable 56 is surrounded by housing cap 59 and cable 56 is rotated by a motor (not shown). The first powered gear 58 along with the first sector gear 51 provide a first powered gear means for adjustably connecting the first link 31 to the vehicle opposite the rearward (first) 37 end of the first link 31. The housing 52 is attached to the first link 31.

The first link 31 is surrounded by a second link 40 which is generally shaped like a C channel. The second link 40 is slidably mounted over the first link 31 plastic slides 33. The second link 40 has fixably connected thereto a second sector gear 42 at its second rearward end. The second link 40 also has fixably connected thereto a second powered worm gear 72 powered by a cable 73. The setting of the second link 40 (and the seat 13) is adjusted longitudinally by the worm gear 72 which is in meshed engagement with the rack 35.

Figure 3:
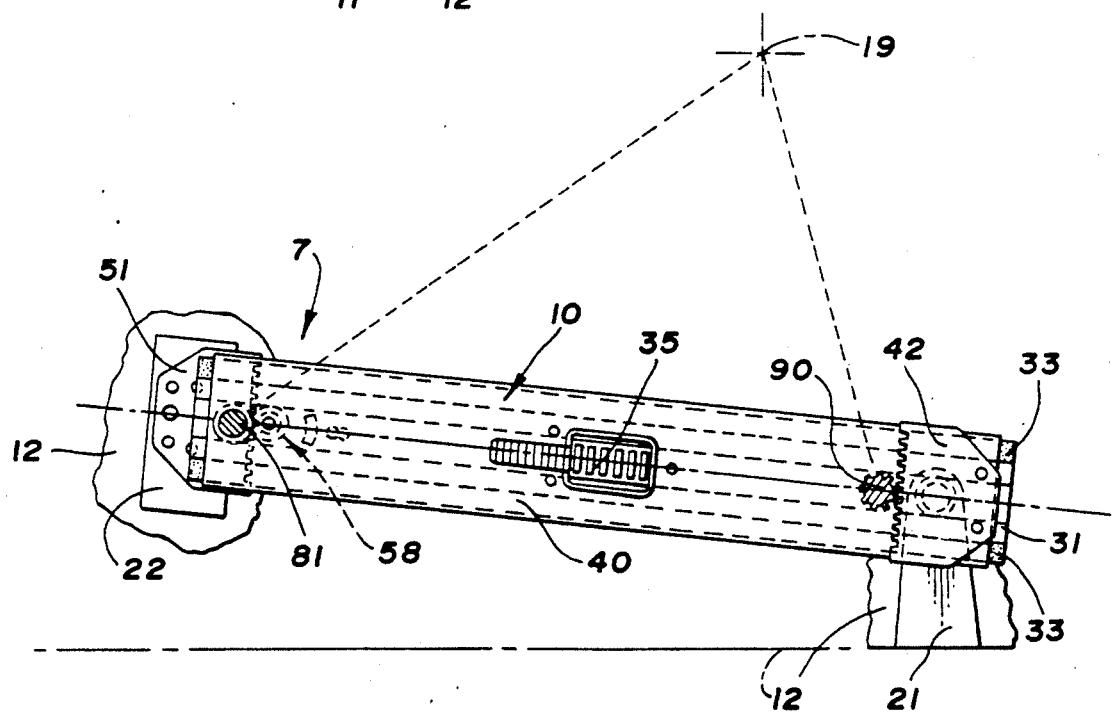
FIGS. 3, 4, and 5 are fragmentary views with the vehicle seat and portions of the vehicle seat adjuster removed for clarity of illustration, demonstrating the operation of the vehicle seat adjuster.

Referring additionally to FIG. 3, pivotally connected to the second link 40 adjacent its forward second end 44 by a pin 81 (FIG. 2) is the vehicle seat 13 (or seat frame 17). The seat 13 extends at its rearward end and has connected thereto a third powered gear means 90 configured, housed and powered in a manner similar to the first powered gear 58. The third gear 90 is meshed with the second sector gear 42.

Figure 4:
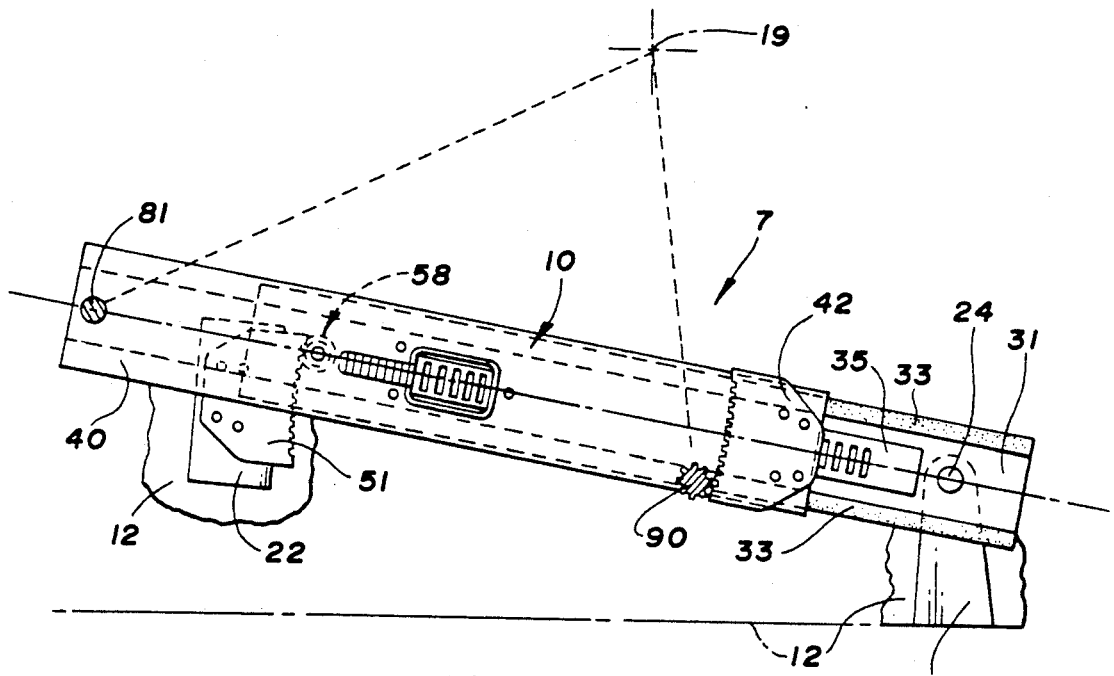
Figure 5:
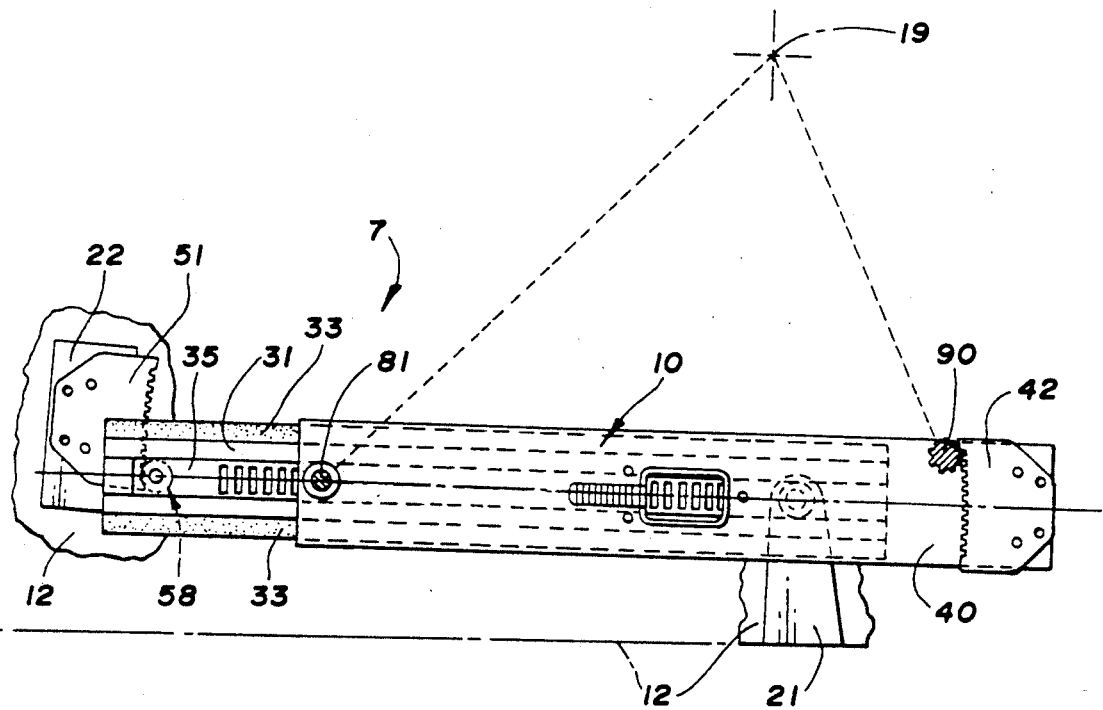

Referring additionally to FIGS. 4 and 5, the first powered gear 58 along with the first sector gear 51 control the elevation of the front portion of seat 13. As shown in FIG. 3 first powered gear 58 has been rotated upward (from the position shown in FIG. 1). The "H" point (center of gravity of the seat occupant) is shown at position 19.

The longitudinal position of the seat 13 is controlled by the second powered gear 72 and the rack 35. FIG. 4 illustrates the seat 13 being moved forward. The elevation of the rearward end of seat 13 is controlled by the third powered gear 90 and the second sector gear 42. FIG. 5 illustrates the rearward end of the seat 13 being elevated from the positions shown in FIGS. 3 or 4. If only a four-way seat adjuster is desired the second sector gear 42 can be eliminated and the seat 13 can be directly connected to the second link 40.

The seat adjuster slide 10 only requires 3 links to effect six-way adjustment, the first link 31, the second link 40 and the seat 13 or seat frame 17. Prior six-way power seat adjuster slides required four or more links. Another advantage of the seat adjuster slide 10 is that the pivotal joints of the adjuster slide 10 can be directly connected to the vehicle (first stand 21) and pin 24 can be sufficiently large to allow for occupant restraint attachment directly to the seat adjuster 7. The worm gear 72 multi-tooth engagement with the rack 35 also provides added strength for sudden vehicle declarations.

Still another advantage of the present invention is that the pivotal point 81 can be located almost at the end of the seat 13. Therefore, adjustment of the rear elevation of the seat 13 will not have a great effect on the elevation of the front portion of the seat 13.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A six-way non-manually powered vehicle seat adjuster, said adjuster in combination comprising:
    a first link pivotally connected with said vehicle along a first rearward end of said first link;
    a second link with first and second ends, said second link being slidably mounted to said first link;
    means for pivotally connecting said vehicle seat to said second link generally adjacent to said second link second end; and
    a first powered gear means adjustably connecting said first link to said vehicle at an end of said first link generally opposite said first link first end, second powered gear means for adjustably setting the position of said second link with respect to said first link, third powered gear means for adjustably setting the position of said seat with respect to first end of second link whereby the elevation of a second end of said seat is controlled by said first powered gear means, and the elevation of a first end of said seat is controlled by said third powered gear means, and the longitudinal position of said seat is controlled by said second powered gear means.

2. A seat adjuster as described in claim 1 wherein first powered gear means includes a first sector gear fixed with said vehicle and a first powered gear rotatably mounted to said first link and meshed with said first sector gear.

3. A seat adjuster as described in claim 1 wherein said second powered gear means includes a worm gear rotatably mounted to said second link and meshed with a rack fixably connected with said first link.

4. A vehicle seat adjuster as described in claim 1 wherein said third powered gear means includes a sector gear connected to said first end of said second link meshed with a powered gear rotatably connected with said vehicle seat.

5. A six-way non-manually powered vehicle seat adjuster, said adjuster in combination comprising:
    a first rearward and second forward stands connected with said vehicle said forward stand having a first sector gear attached thereto;
    a first link pivotally connected with said rearward stand along a rearward end of said first link said first link having a longitudinal rack;
    a second link slidably mounted to said first link having a second sector gear along its rearward end;
    means for pivotally connecting said vehicle seat to said second link generally adjacent to said second link forward end;
    a first powered gear rotatably connected with said first link and meshed with said first sector gear for adjustably connecting said first link to said vehicle at a forward end;
    a second powered gear rotatably connected to said second link and meshed with said rack; and
    a third powered gear rotatably connected to said seat and in mesh with said second sector gear whereby the elevation of said forward end of said seat is controlled by said first powered gear and the elevation of the rear end of said seat is controlled by said third powered gear and the longitudinal position of said seat is controlled by said second powered gear.

* * * * *